US011345598B2

(12) United States Patent
Olson, III et al.

(10) Patent No.: US 11,345,598 B2
(45) Date of Patent: May 31, 2022

(54) METHOD FOR PORE STABILIZED CARBON FOAM

(71) Applicant: CFOAM LLC, Triadelphia, WV (US)

(72) Inventors: Rudolph A. Olson, III, Hendersonville, NC (US); Chris Yurchick, McDonald, PA (US); Doug Amie, Adena, OH (US); Bruce Hines, Jacobsburg, OH (US)

(73) Assignee: CFOAM LLC, Triadelphia, WV (US)

( * ) Notice: Subject to any disclaimer, the term of this patent is extended or adjusted under 35 U.S.C. 154(b) by 312 days.

(21) Appl. No.: 16/587,816

(22) Filed: Sep. 30, 2019

(65) Prior Publication Data

US 2020/0115232 A1  Apr. 16, 2020

Related U.S. Application Data (60) Provisional application No. 62/743,627, filed on Oct. 10, 2018.

(51) Int. Cl.
*C01B 31/02* (2006.01)
*C01B 32/05* (2017.01)

(52) U.S. Cl.
CPC .......... *C01B 32/05* (2017.08); *C01P 2006/14* (2013.01)

(58) Field of Classification Search
CPC ...................................................... C01B 32/05
See application file for complete search history.

(56) References Cited

U.S. PATENT DOCUMENTS

| 3,933,520 | A | * | 1/1976 | Gay | H01M 4/02 |
| | | | | | 429/231.95 |
| 3,979,196 | A | * | 9/1976 | Frank | C03B 40/02 |
| | | | | | 65/374.15 |
| 6,146,611 | A | * | 11/2000 | Dillon | C04B 35/521 |
| | | | | | 264/29.1 |
| 6,656,239 | B1 | * | 12/2003 | Rogers | C04B 28/02 |
| | | | | | 264/29.1 |
| 6,749,652 | B1 | | 6/2004 | Rogers | |
| 6,814,765 | B1 | | 11/2004 | Rogers | |
| 7,588,608 | B2 | | 9/2009 | Rogers | |
| 10,941,042 | B2 | * | 3/2021 | Stiller | C01B 32/184 |

* cited by examiner

*Primary Examiner* — Stuart L Hendrickson
(74) *Attorney, Agent, or Firm* — Kirk A. Wilson; Joseph T. Guy; Patent Filing Specialist Inc.

(57) ABSTRACT

A method for producing carbon foam utilizing a particulate pore stabilizer is described. The method provides for an increase in the uniformity of the pore structure and distribution of pores throughout the carbon foam, as well as an increase in volume of the resultant carbon foam. A pore stabilized carbon foam prepared by the method is also described.

16 Claims, 4 Drawing Sheets

METHOD FOR PORE STABILIZED CARBON FOAM

CROSS-REFERENCE TO RELATED APPLICATIONS

The present invention claims priority to U.S. Provisional Patent Application No. 62/743,627, filed Oct. 10, 2018, which is incorporated herein by reference in its entirety.

FIELD OF THE DISCLOSURE

The present invention is directed to a method for producing carbon foam using an admixture of particulate pore stabilizer and a starting material as a precursor.

BACKGROUND OF THE DISCLOSURE

Carbon foam can be created using coal as a precursor and a graphite foam can be created using mesophase pitch as a precursor. In both manufacturing processes, the precursor is heated in a nitrogen (inert) filled atmosphere so that it does not burn. The precursor first melts as it is heated, then evolves gases that cause the material to foam. The foaming step is done under high pressure to help regulate bubble formation. As oxygen, nitrogen, and hydrogen are eliminated from the precursor during heat up, the carbon continues to cross-link until only a glassy carbon material remains at 1000° C. In the case of graphite foam, further heating induces nucleation and growth of graphite crystals.

Figure 1:
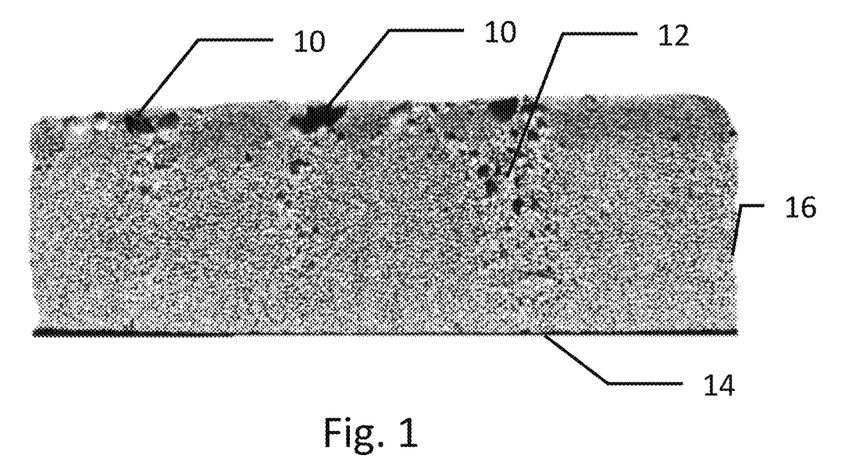
FIGS. 1 and 2 are images of cross-section and top down of non-pore stabilized carbon foam with large voids (bubbles).
Figure 2:
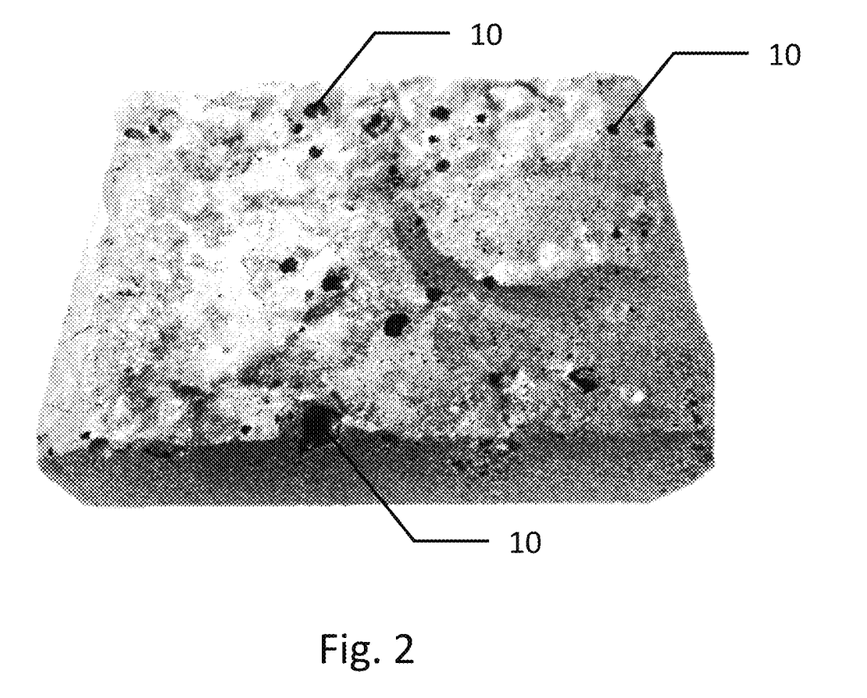

The process is very "organic" in nature and the resultant product looks much like a loaf of bread. The pores in the foam are not particularly uniform, but can be stabilized as disclosed herein. During the foaming step, smaller pores tend to grow into bigger ones via Ostwald ripening and the bigger ones tend to rise through the foam more quickly than smaller ones according to Stokes Law. Bubbles at the top of the foam can also coalesce as the liquid drains from the top to the bottom; bubbles will destabilize when the ratio of liquid-to-vapor drops below at critical value. Thus, the pore structure tends to be non-uniform with a gradient from bottom to top. This is particularly evident in graphite foam, as the mesophase pitch melts completely to a liquid, whereas the carbon foam melts only partially. FIGS. 1 and 2 are images showing a top view and cross-section of non-pore stabilized carbon foam. Note the large bubbles 10 that congregate near the surface. Note also the large bubbles appear to congregate in regions 12, suggesting they may be preferentially nucleating along the bottom 14 and sides 16 of the pan. Overall, the bubbles 10 in melted mesophase pitch appear to have a driving force to enlarge and move upwards.

Carbon foam is typically a strong, open cell, durable, stable, easily machined, and relatively unreactive lightweight material. Carbon foams are carbonaceous materials of very high carbon content that have appreciable void volume. As such, carbon foams are primarily comprised of elemental carbon. In appearance, excepting color, carbon foams resemble readily available commercial plastic foams. The void volume of carbon foams is located within numerous empty cells. The boundaries of these cells are defined by the carbon structure. These cells typically approximate ovoids of regular, but not necessarily uniform, size, shape, distribution, and orientation. The void volumes in these cells may directly connect to neighboring void volumes. Such an arrangement is referred to as an open-cell foam. The carbon in these foams forms a structure that is continuous in three dimensions across the material.

The height of carbon foam and graphite foam is also largely a function of bubble stability. If bubbles have a propensity to grow, their tendency to rise increases, which reduces the stability of the foam. In general, if the growth of bubbles can be inhibited, the foam tends to be more stable, which enables better foam heights and greater manufacturing yields.

Altering the mechanical characteristics, such as the density, compressive strength, and the like requires altering the process parameters, such as the temperatures and pressures. By starting the manufacturing process from an admixture of materials, the properties of the final foam product can be altered. Therefore, it is beneficial to produce a pore stabilized carbon foam to obtain these desirable properties.

BRIEF SUMMARY OF THE INVENTION

The present invention is a method for producing pore stabilized carbon foam comprising the steps of: adding a particulate pore stabilizer to a carbon foam starting material to form an admixture; and heating the admixture under controlled temperature and pressure sufficient to produce a pore stabilized carbon foam.

Also, a pore stabilized carbon foam is prepared by the process comprising the steps of: adding a particulate pore stabilizer to a carbon foam starting material to form an admixture; and heating the admixture under controlled temperature and pressure sufficient to produce a pore stabilized carbon foam.

DETAILED DESCRIPTION OF THE INVENTION

Some embodiments of the present invention are described in this section in detail sufficient for one skilled in the art to practice the present invention without undue experimentation. It is to be understood, however, that the fact that a limited number of preferred embodiments are described in this section does not in any way limit the scope of the present invention as set forth in the claims.

It is to be understood that whenever a range of values is described herein, i.e. whether in this section or any other part of this patent document, the range includes the end points and every point there between as if each and every such point had been expressly described. Unless otherwise stated, the words "about" and "substantially" as used herein are to be construed as meaning the normal measuring and/or fabrication limitations related to the value or condition which the word "about" or "substantially" modifies. Unless expressly stated otherwise, the term "embodiment" is used herein to mean an embodiment of the present invention. The term "mold", as used herein is meant to define a mechanism for providing controlled dimensional forming of the expanding coal. Thus, any chamber into which the admixture is deposited prior to or during heating and which, upon the coal powder attaining the appropriate expansion temperature, contains and shapes the expanding porous coal to some predetermined configuration such as: a flat sheet; a curved sheet; a shaped object; a building block; a rod; tube or any other desired solid shape can be considered a "mold" for purposes of the instant invention.

Typically, the cells in carbon foams are of a size that is readily visible to the unaided human eye. Also, the void volume of carbon foams is such that it typically occupies much greater than one-half of the carbon foam volume. The density of carbon foams typically is less than about 1.0 g/cm$^3$ and generally less than about 0.8 g/cm$^3$. In some embodiments, the density for carbon foam may range from about 0.05 g/cm$^3$ to about 0.8 g/cm$^3$. In some embodiments, carbon foams may exhibit compressive strengths ranging up to about 10,000 psi. In other embodiments, the compressive strength for carbon foam may range from about 100 psi to about 10,000 psi. In certain other embodiments, compressive strengths for carbon foam may range from about 400 psi to about 7,000 psi. The carbon foam incorporated in a tool body may be carbonized carbon foam. Alternatively, if desired, the carbon foam incorporated in a tool body may be graphitized carbon foam.

Carbon foams have been produced by a variety of methods. Some of these methods include producing carbon foams directly from particulate coal. For example, U.S. Pat. Nos. 6,749,652; 6,814,765; and 7,588,608; each herein incorporated by reference in their entirety, describe methods for producing carbon foam directly from particulate coal. To produce carbon foam from particulate coal, typically, a suitable swelling coal, such as bituminous coal, is heated in an essentially closed vessel. The particulate coal is placed in a mold and is heated in an inert atmosphere under process atmospheric pressures typically greater than ambient and can reach pressures of about 500 psi or greater. The particulate coal is heated to temperatures sufficient to cause the coal to become plastic and swell, forming a carbon foam. In many instances, heating the particulate coal to a temperature between about 300° C. and about 500° C. is sufficient to form a carbon foam material. The temperatures and pressure conditions will vary depending upon the characteristics of the particulate coal. The resultant carbon foam may subsequently be heated under an essentially inert, or otherwise non-reactive, atmosphere, to temperatures as great as about 3000° C. Heating of the carbon foam to such elevated temperatures has been found to improve certain properties of the foam. Such properties have included, but are not limited to, electrical resistance, thermal conductivity, thermal stability, and strength. The production of carbon foam from mesophase pitch follows a similar process.

During heating, the particles begin to melt and evolve gases that cause the material to foam. The foaming step is done under high pressure to help regulate bubble formation. As oxygen, nitrogen, and hydrogen are eliminated from the precursor during heat up, the carbon continues to cross-link until only a glassy like carbon material remains at 1000° C. Where mesophase pitch is used, further heating induces nucleation and growth of graphite crystals.

The typical foaming process must be tightly controlled in order to provide relatively uniform pore sizes and distribution throughout the foam. Even with tight controls on the process, non-uniformity of the pore sizes and distribution can occur. During the process, smaller pores tend to grow into bigger ones and the bigger pores tend to rise throughout the foam more quickly than smaller ones. This tendency during the foaming process can induce the formation of a gradient in pore size from the bottom to the top of the foam.

When using mesophase pitch as the precursor, the material completely melts. As a result, nucleation of bubbles may be promoted at the sides and bottom of the metal pan used to contain the melt. This excessive localized bubble formation can result in regions of the foam that contain very coarse porosity. Addition of particulate pore stabilizer can help promote nucleation of bubbles across the volume of the foam and limit excessive bubble formation coming from the sides and bottom of the pan. Additionally, large pore sizes are often observed in regions along the bottom and sides of the pan used for the foaming process.

The present invention is directed to adding a particulate pore stabilizer to the coal particulate or mesophase pitch starting material such that bubble formation and resulting pore formation is stabilized during the foaming process to provide a more uniform distribution of pores through the carbon foam body.

Without intending to be bound by theory, the heights or overall volume of the carbon foam is believed to be a function of bubble stability during the foaming process. If the bubbles have a propensity to grow, their tendency to rise increases, which reduces the stability of the foam. In general, if the growth of the bubbles can be inhibited, the foam tends to be more stable, which enables better foam heights and greater manufacturing yields.

There are several advantages in stabilizing the pore formation and controlling pore size distribution throughout the carbon foam. Uniform pore size and distribution provides more consistent properties throughout the carbon foam. Additionally, stabilizing the pore formation during the foaming process allows for a greater volume of carbon foam to be produced.

In aqueous systems, improving the stability of bubbles is often done through the use of surfactants, which are molecules that have a hydrophilic head and a hydrophobic tail. Surfactants will tend to align at the bubble interface with the hydrophobic head oriented into the vapor side and the hydrophilic end oriented to the aqueous phase. Stabilizing bubbles in liquefied coal or mesophase pitch is not straightforward, as it must be accomplished in a complex mix of organic polymers at relatively high temperatures, greater than 340° C. Surfactants are generally not a suitable option for stabilizing bubbles and controlling pore formation during the carbon foam making process.

The present invention involves introducing a particulate pore stabilizer to the coal particulate or mesophase pitch starting material. The particulate pore stabilizer is a material that increases the stability of the bubbles formed during the foaming process and preferably help promote nucleation of bubbles throughout the volume of the foam instead of just at the sides and bottom of the carbon foam panel. In some embodiments, the particulate pore stabilizer preferably provides a wetting angle, or contact angle, between the particulate and the liquid phase of between about 50 degrees and about 105 degrees. The wetting (contact) angle is measured at the foam-bubble interface to better quantify wettability.

In some embodiments, the particulate pore stabilizer may include, but is not limited to, carbon black; oxides such as alumina, silica, kyanite, boric acid and titania; ceramics such as silicon carbide, aluminosilicate clay, and fine metal powders. Preferably, the particulate pore stabilizer does not have a significant detrimental impact on the resultant properties of the carbon foam. Alternatively, the particulate pore stabilizer may be selected to add or tailor a property for the carbon foam. In some embodiments, the particular pore stabilizer is able to withstand the thermal treatment temperatures during the carbon foam making process without melting or otherwise decomposing. Further combinations or mixtures of different particulate pore stabilizers may be used.

The particulate pore stabilizer may be added in amounts ranging from about 0.1% to about 10% by weight. In certain embodiments, the particulate pore stabilizer may be added in amounts less than about 1% by weight. In some embodiments, the majority of the particle sizes in the particulate pore stabilizer are preferably less than 10 µm. Preferably, the particle sizes are less than about 5 µm. In some embodiments, the particle sizes in the particulate pore stabilizer may range from about 3 to about 4 µm.

In practice, the desired amount of particulate pore stabilizer is added to or blended with a carbon foam starting material such as a particular coal, mesophase pitch, or combinations thereof to form an admixture. The admixture is added to a mold or pan and heated under controlled temperature and pressure conditions as described above to form carbon foam. In some embodiments, the use of the particulate pore stabilizer during the foaming process may increase the volume of carbon foam from about 5% to about 50% above non-pore stabilized carbon foam.

Figure 3:
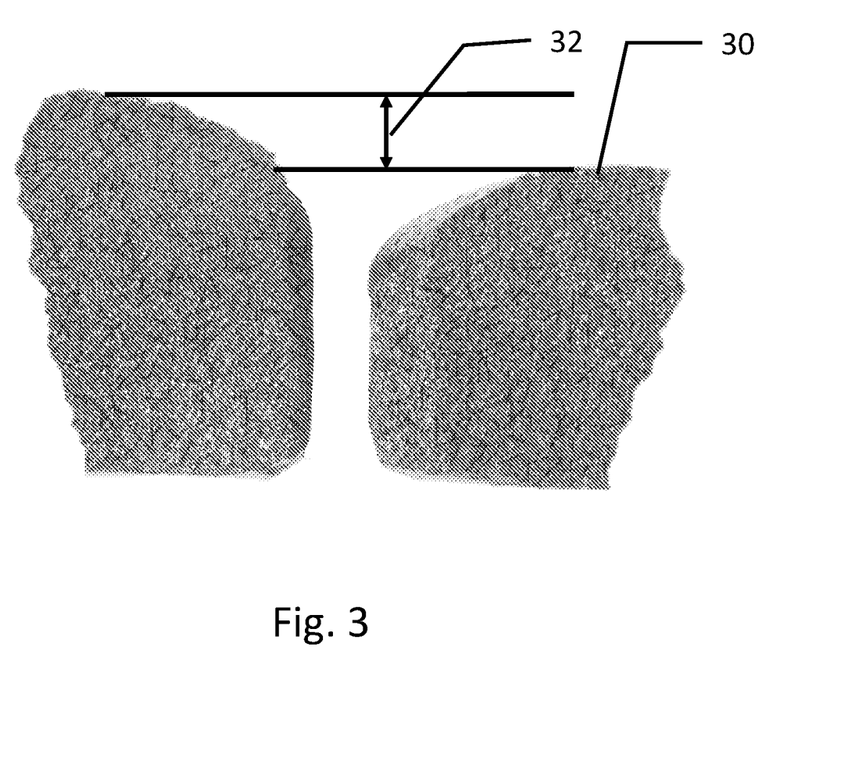
FIG. 3 are images of cross-sections of pore stabilized carbon foam using 1% carbon black (left), versus non-pore stabilized carbon foam (right).

Example 1 (FIG. 3): The production of carbon foam from mesophase pitch using about 1% carbon black as the particulate pore stabilizer resulted in a carbon foam having an overall finer pore structure with a uniform distribution of pores, as well as an increase in foam volume of about 15%. FIG. 3 illustrates cross-sections of pore-stabilized carbon foam using 1% carbon black (left), versus non-pore stabilized carbon foam (right). Close examination of the non-pore stabilized (right) reveals some large pores 30 within 1-inch of the top, whereas the material with 1% carbon black (left) contains none. Also note the height 32 and volume of the pore stabilized carbon foam containing 1% carbon black (left) is considerably higher signifying a volume increase.

Figure 4:
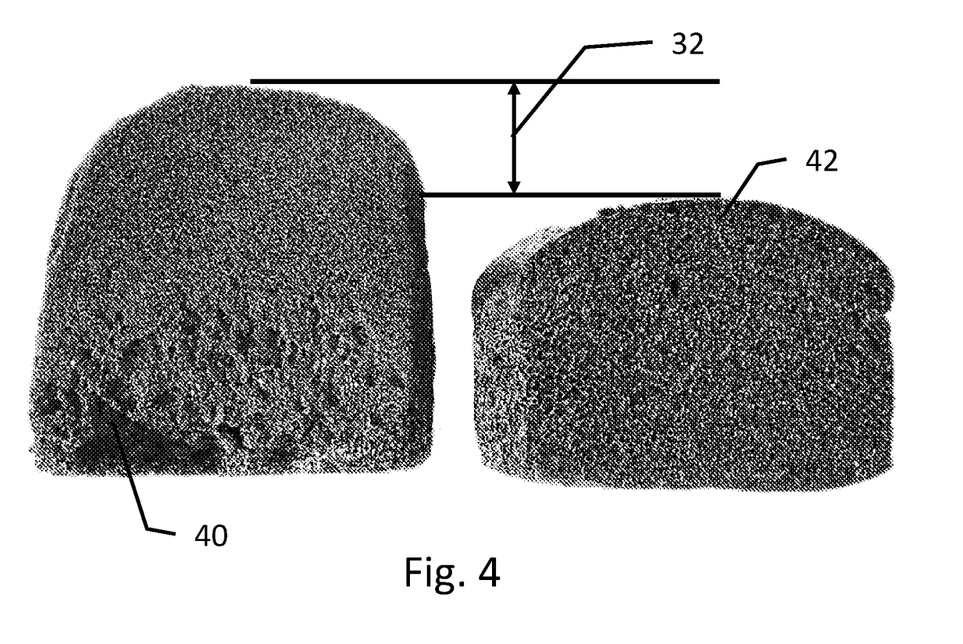
FIG. 4 are images of cross-sections of pore stabilized carbon foam with 1% silica fume (left), versus non-pore stabilized carbon foam (right).

Example 2 (FIG. 4): The production of carbon foam from mesophase pitch using about 1% silica fume as the particulate pore stabilizer resulted in a carbon foam having an overall finer pore structure and an increase in uniformity of the pores with very limited large pores and exhibited an increase in carbon foam volume of about 40%. FIG. 4 illustrates cross-sections of pre stabilized carbon foam with 1% silica fume (left), versus non-pore stabilized carbon foam (right). The silica fume appeared to generate some type of microstructural defect 40 near the bottom (possibly agglomerates of silica), but was still very effective in limiting large pores 42 near the top and also generating much greater height and volume.

Figure 5:
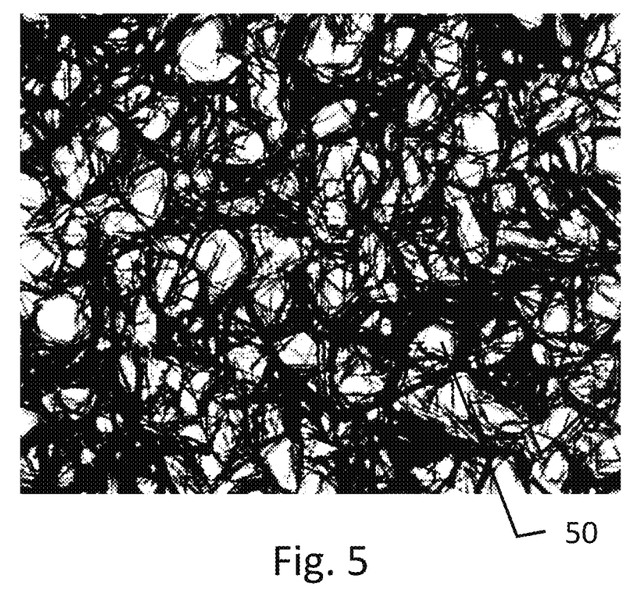
FIGS. 5 and 6 are images of pore stabilized carbon foam from particulate coal using about 4% calcined alumina (about 3 to 4 μm, d50) as the particulate pore stabilizer (FIG. 5), versus non-pore stabilized carbon foam (FIG. 6).
Figure 6:
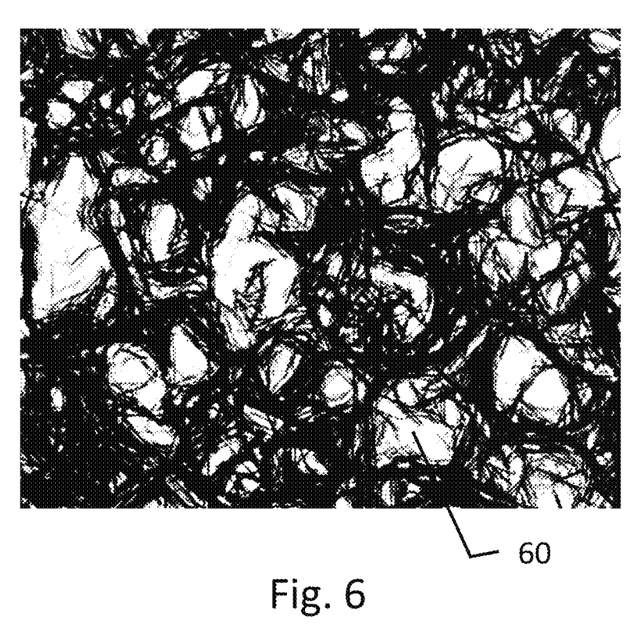

Example 3 (FIGS. 5 and 6): The production of carbon foam from particulate coal using about 4% calcined alumina (about 3 to 4 µm, d50) as the particulate pore stabilizer resulted in a carbon foam having an overall finer pore structure with a uniform distribution of pores. FIGS. 5 and 6 are high magnification images of pore stabilized carbon foam with 4% fine calcined alumina from Aluchem (left), versus non-pore stabilized carbon foam (right). Note the pore stabilized pore size 50 sample is about half the size of the non-pore stabilized pore size 60. The use of silica fume and carbon black as the particulate pore stabilizer did not appear to have a major impact on pore structure and uniformity when used with a particulate coal.

A low density pore stabilized carbon foam, made from a starting material and a particulate pore stabilizer, can have a density from about 0.1 to about 0.8 $g/cm^3$, preferably from about 0.2 to about 0.6 $g/cm^3$ and most preferably from about 0.3 to about 0.4 $g/cm^3$. The starting material can be powdered coal particulate preferably less than about 0.5 inch in diameter, then admixed with a particulate pore stabilizer, and processed by controlled heating of the admixture in a "mold" under a non-oxidizing atmosphere. The starting material coal may include bitumen, anthracite, or even lignite, or blends of these coals that exhibit a "free swell index" as determined by ASTM D720 of between about 3.5 and about 5.0, but are preferably bituminous, agglomerating coals that have been comminuted to an appropriate particle size, preferably to a fine powder below about −60 to −80 mesh. Additionally, according to further highly preferred embodiments of the present invention the coal starting materials of the present invention possess all or at least some of the following characteristics: 1) a volatile matter content (dry, ash-free basis) of between about 35% and about 45% as defined by ASTM D3175, "Test Method for Volatile Matter in the Analysis of Coal and Coke"; 2) a fixed carbon (dry basis) between about 50% and about 60% as defined by ASTM D3172, "Practice for Proximate Analysis of Coal and Coke"; 3) a Gieseler initial softening temperature of between about 380° C. and about 400° C. as determined by ASTM D2639, Test Method for Plastic Properties of Coal by the Constant-Torque Gieseler Plastometer"; 4) a plastic temperature range above about 50° C. as determined by ASTM D2639; 5) a maximum fluidity of at least 300 ddpm (dial divisions per minute) and preferably greater than about 2000 ddpm as determined by ASTM D2639; 6) expansion greater than about 20% and preferably greater than about 100% as determined by Arnu Dilatation; 7) vitrinite reflectance in the range of from about 0.80 to about 0.95 as determined by ASTM D2798, "Test Method for Microscopical Determination of the Reflectance of Vitrinite in Polished Specimens of Coal"; 8) less than about 30% inert maceral material such as semifusinite, micrinite, fusinite, and mineral matter as determined by ASTM D2798; and 9) no significant oxidation of the coal (0.0 vol % moderate or severe oxidation) as determined by ASTM D 2798 and non-maceral analysis. The low softening point (380-400° C.) is important so that the material softens and is plastic before volatilization and coking occur. The large plastic working range or "plastic range" is important in that it allows the coal to flow plastically while losing mass due to volatilization and coking. Vitrinite reflectance, fixed carbon content and volatile matter content are important in classifying these coal starting materials as "high-volatile" bituminous coals that provide optimum results in the process of the present invention and thus, carbon foam materials that exhibit an optimum combination of properties when prepared in accordance with the process described and claimed herein. The presence of oxidation tends to hinder fluidity and consequently, foam formation.

Thus according to various embodiments of the present invention, a coal particulate starting material characterized as a high-volatile bituminous coal containing from about 35% to about 45% by weight (dry, ash-free basis) volatile matter, as defined by ASTM D3175, is a basic requirement for obtaining optimum results in the form of optimum carbon foaming in accordance with the process of the present invention. The various parameters derived from the Gieseler plasticity evaluations form the second highly important set of characteristics of the starting material coal if optimum results are to be obtained. Thus, a softening point in the range of from about 380° C. and about 400° C., a plastic range of at least about 50° C. and preferably between about 75 and 100° C., and a maximum fluidity of at least several hundred and preferably greater than 2000 ddpm (dial divisions per minute) are highly important to the successful optimized practice of the present invention. Accordingly, in order to obtain the carbon foams exhibiting the superior properties described herein, it is important that the coal starting material be a high volatile bituminous coal having a softening point as just described and a plastic range on the order of above about 50° C. all with the indicated Gieseler fluidity values described. Exhibition of Arnu dilatation values greater than about 20% and preferably above about 100% when combined with the foregoing characteristics provide indications of a highly preferred high volatile bituminous coal starting material.

The cellular coal-based products described herein are semi-crystalline or more accurately turbostratically-ordered and largely isotropic, i.e., demonstrating physical properties that are approximately equal in all directions. The cellular coal-based products typically exhibit pore sizes on the order of less than 300 µm, although pore sizes of up to 500 µm are possible within the operating parameters of the process described. The thermal conductivities of the cellular coal-based products are generally less than about 1.0 W/m-K. Typically, the cellular coal-based products of the present invention demonstrate compressive strengths on the order of from about 1500 to about 3000 psi at densities of from about 0.4 to about 0.5 g/cm$^3$. The coal starting material can exhibit the previously specified free swell index of between about 3.5 and about 5.0 and preferably between about 3.75 and about 4.5. Selection of starting materials within these parameters was determined by evaluating a large number of coals characterized as ranging from high to low volatiles. In general, it has been found that bituminous coals exhibiting free swell indexes within the previously specified ranges provided the best foam products in the form of the lowest calcined foam densities and the highest calcined foam specific strengths (compressive strength/density). Such bituminous coals that also possess the foregoing set of properties, high volatile content (35% to 45% by weight), large plastic range (at least about 50° C.), etc. and are thus characterized as high volatile bituminous coals, form the preferred starting materials of the process of the present invention. Coals having free swell indices below the specified preferred ranges may not agglomerate properly leaving a powder mass or sinter, but not swell or foam, while coals exhibiting free swell indices above these preferred ranges may heave upon foaming and collapse upon themselves leaving a dense compact.

The production method of the present invention comprises: 1) heating a high volatile bituminous coal admixture of preferably small i.e., less than about 100-µm particle size in a "mold" and under a non-oxidizing atmosphere at a heat up rate of from about 1 to about 20° C. to a temperature of between about 300 and about 700° C.; 2) soaking at a temperature of between about 300 and 700° C. for about 10 minutes up to about 12 hours to form a preform or finished product; and 3) controllably cooling the preform or finished product to a temperature below about 100° C. The non-oxidizing atmosphere may be provided by the introduction of inert or non-oxidizing gas into the "mold" at a pressure of from about 0 psi, i.e., free flowing gas, up to about 500 psi. The inert gas used may be any of the commonly used inert or non-oxidizing gases such as nitrogen, helium, argon, $CO_2$, etc.

It is generally not desirable that the reaction chamber be vented or leak during the heating and soaking operation. The pressure of the chamber and the increasing volatile content therein tends to retard further volatilization while the cellular product sinters at the indicated elevated temperatures. If the furnace is vented or leaks during soaking, an insufficient amount of volatile matter may be present to permit inter-particle sintering of the coal particles, thus resulting in the formation of a sintered powder as opposed to the desired cellular product. Thus, according to a preferred embodiment of the present process, venting or leakage of non-oxidizing gas and generated volatiles is inhibited, consistent with the production of an acceptable cellular product. Additionally, more conventional blowing agents may be added to the particulate prior to expansion to enhance or otherwise modify the pore-forming operation.

As the mold pressure increases from 0 psi to 500 psi, as imposed by the non-oxidizing gas, the reaction time will increase and the density of the pore stabilized admixture will increase as the size of the "bubbles" or pores produced in the expanded coal decreases. Similarly, a low soak temperature at, for example, about 400° C. will result in a larger pore or bubble size and consequently a less dense expanded coal than would be achieved with a soak temperature of about 600° C. Further, the heat-up rate will also affect pore size, a faster heat-up rate resulting in a smaller pore size and consequently a denser expanded coal product than a slow heat-up rate. These phenomenon are, of course, due to the kinetics of the volatile release reactions which are affected, as just described, by the ambient pressure and temperature and the rate at which that temperature is achieved. These process variables can be used to custom produce the expanded coals of the present invention in a wide variety of controlled densities, strengths etc.

Cooling of the preform or product after soaking is not particularly critical except as it may result in cracking of the preform or product as the result of the development of undesirable thermal stresses. Cooling rates less than 10° C./min to a temperature of about 100° C. are typically used to prevent cracking due to thermal shock. Somewhat higher, but carefully controlled cooling rates may however, be used to obtain a "sealed skin" on the open cell structure of the product as described below. The rate of cooling below 100° C. does not influence the final product.

After expanding the high volatile bituminous admixture as just described, the porous or foamed coal product is an open celled material. Several techniques have been developed for "sealing" the surface of the open celled structure to improve its adhesive capabilities for further fabrication and assembly of a number of parts. For example, a layer of a commercially available graphitic adhesive can be coated onto the surface and cured at elevated temperature or allowed to cure at room temperature to provide an adherent skin. Alternatively, the expansion operation can be modified by cooling the expanded coal product or preform rapidly, e g. at a rate of 10° C./min or faster after expansion. It has been discovered that this process modification results in the formation of a more dense skin on the preform or product which presents a closed pore surface to the outside of the preform or product. At these cooling rates, care must be exercised to avoid cracking of the preform or product.

After expanding, the porous coal-based preform or product, i.e. carbon foam in accordance with the present invention, is readily machineable, sawable and otherwise readily fabricated using conventional fabrication techniques.

Subsequent to production of the preform or product as just described, the preform or product may be subjected to carbonization and/or graphitization according to conventional processes to obtain particular properties desirable for specific applications of the type described hereinafter. Ozonation may also be performed, if activation of the coal-based expanded product would be useful in a final product application such as in filtering of air. Additionally, a variety of additives and structural reinforcers may be added to the coal based preforms or products either before or after expansion to enhance specific mechanical properties such as fracture strain, fracture toughness, and impact resistance. For example, particles, whiskers, fibers, plates, etc. of appropriate carbonaceous or ceramic composition can be incorporated into the porous coal-based preform or product to enhance its mechanical properties.

The open celled, coal-based preforms or products, i.e. carbon foams, of the present invention can additionally be impregnated with, for example, petroleum pitch, epoxy resins or other polymers using a vacuum assisted resin transfer type of process. The incorporation of such additives provides load transfer advantages similar to those demonstrated in carbon composite materials. In effect a 3-D composite is produced that demonstrates enhanced impact resistance and load transfer properties.

The cooling step in the expansion process results in some relatively minimal shrinkage on the order of less than about 5% and generally in the range of from about 2% to about 3%. This shrinkage must be accounted for in the production of near net shape preforms or final products of specific dimensions and is readily determinable through trial and error with the particular coal starting material being used. The shrinkage may be further minimized by the addition of some inert solid material such as coke particles, ceramic particles, ground waste from the coal expansion process etc. as is common practice in ceramic fabrication.

Carbonization, sometimes referred to as calcining, is conventionally performed by heating the preform or product under an appropriate inert gas at a heat-up rate of less than about 5° C. per minute to a temperature between about 800° C. and about 1200° C. and soaking for from about 1 hour to about three or more hours. Appropriate inert gases are those described above that are tolerant of these high temperatures. The inert atmosphere is supplied at a pressure from about 0 psi up to a few atmospheres. The carbonization/calcination process serves to remove all of the non-carbon elements present in the preform or product such as sulfur, oxygen, hydrogen, etc.

Graphitization, commonly involves heating the preform or product either before or after carbonization at heat-up rate of less than about 10° C. per minute, preferably from about 1° C. to about 5° C. per minute, to a temperature of between about 1700° C. and about 3000° C. in an atmosphere of helium or argon and soaking for a period of less than about one hour. Again, the inert gas may be supplied at a pressure ranging from about 0 psi up to a few atmospheres.

The porous coal-based preforms or products resulting from processing in accordance with the foregoing procedures can be used in a broad variety of product applications, some, but not all, of which will now be broadly described.

Products that could be fabricated using the coal-based porous preforms or products of the present invention are various lightweight sheet products useful in the construction industry. Such products may involve the lamination of various facing materials to the surface of a planar sheet of the preform material using an appropriate adhesive. For example, a very light and relatively inexpensive wall board would simply have paper laminated to its opposing planar surfaces, while a more sophisticated curtain wall product might have aluminum sheet, polymer or fiber-reinforced polymer sheets or even stainless steel sheet laminated thereto. A wide variety of such products that have lightweight, low cost and adequate strength can easily be envisioned for wallboard, structural wallboard, bulkheads, etc. The materials of the present invention exhibit sound insulation and vibration resistance due to excellent sound and vibration damping properties, good thermal insulating properties (less than about 1 watt per meter K thermal conductivity).

Laminates of these materials may even be used to produce heating element incorporating members, since a graphitized core could serve as an electrical heating element when connected to an appropriate source of electrical energy.

Similar surface laminated porous preform core based products could also find use in the transportation industry where lighter and, especially fire retardant walls, bulkheads, containers, etc. are in constant demand. Such products would of course require that the expanded coal-based porous core be carbonized as described hereinabove prior to application of the exterior skins, if fire resistance or retardancy is desired.

Yet another product application for the porous coal products or carbon foams of the present invention is as a replacement for the ceramic foam filters currently applied in the filtering of molten metal such as aluminum for the removal of contaminating particulates also called inclusions. The current ceramic foam materials are relatively expensive and extremely friable. It is possible to produce a porous coal-based preform of the type described herein having an appropriate pore size and of the same size and shape as the ceramic foam filter using the above described fabrication process, to serve as a molten metal filter of this type. The cost of such a more robust, i.e., less friable, filter would be considerably less than that of a comparable ceramic foam filter.

Yet other product applications for the carbon foam materials of the present invention reside in the field of heat exchangers. In this application, the heat transfer properties of a graphitized porous coal-based material can be exploited to produce a heat exchanger capable of extracting heat from or adding heat to a fluid (gas or liquid) flowing through porous coal pores. In this case, the coal-based porous product is joined to an appropriate heat transfer mechanism such as an aluminum skin.

The coal-based porous preforms and products of the present invention can be produced in any solid geometric shape. Such production is possible using any number of modified conventional processing techniques such as extrusion, injection molding, etc. In each of such instances, the process must, of course, be modified to accommodate the processing characteristics of the starting material coal. For example, in extruding such products, as described below, the coal powder starting material is fed by an auger into an expansion chamber where it is expanded and from which it is extruded while still viscous. Upon exiting the extrusion die, the material is cooled to provide a solid shape of the desired and pre-calculated dimensions. To improve the efficiency, i.e., cycle time of the process, the input material can be preheated to a temperature below the expansion point, e.g., below about 300° C., fed into the auger chamber where additional heat is imparted to the powder with final heating being achieved just before extrusion through the die.

Similar relatively minor process modifications can be envisioned to fabricate the carbon foams of the present invention in injection molding, casting and other similar conventional material fabrication processes.

The foregoing explanations, descriptions, illustrations, examples, and discussions have been set forth to assist the reader with understanding this invention and further to demonstrate the utility and novelty of it and are by no means restrictive of the scope of the invention. It is the following claims, including all equivalents, which are intended to define the scope of this invention.

The invention claimed is:

1. A method for producing pore stabilized carbon foam comprising the steps of:
   adding a particulate pore stabilizer to a coal starting material to form an admixture, wherein the coal starting material comprises a high-volatile coal of bitumen, anthracite, lignite, and mixtures thereof, comprising about 35% to about 45% by weight volatile matter;
   heating the admixture under controlled temperature and pressure to form a liquid phase admixture consisting of liquid coal starting material and suspended solid particulate pore stabilizer;
   further heating the liquid phase admixture to form a plurality of pores in a pore stabilized carbon foam, wherein the particulate pore stabilizer particles positioned at an interface of the plurality of pores with the liquid phase admixture provides a wetting angle ranging from about 50 degrees and about 105 degrees, therein decreasing the pore size of the plurality of pores to about 50% of the pore size of a non-pore stabilized carbon foam consisting of only the coal starting material; and
   wherein the volume of the pore stabilized carbon foam is increased about 5% to about 50% above the volume of the non-pore stabilized carbon foam.

2. The method of claim 1, wherein the coal starting material comprises coal particulate, mesophase pitch, and mixtures thereof.

3. The method of claim 1, wherein the particulate pore stabilizer comprises: carbon black; oxides of alumina; silica, boric acid and titania; aluminosilicate clay or kyanite; non-oxide powders of silicon carbide or metal powders; and mixtures thereof.

4. The method of claim 1, wherein the initial heating step is performed at a temperature between about 300° C. and about 500° C.

5. The method of claim 1, further comprising; heating the pore stabilized carbon foam in a non-reactive atmosphere to a temperature of about 3000° C.

6. The method of claim 1, further comprising; sealing the surface of the pore stabilized carbon foam with a graphitic adhesive.

7. The method of claim 1, wherein the particulate pore stabilizer is admixed in amounts ranging from about 0.1% to about 10% by weight.

8. The method of claim 1, wherein the particulate pore stabilizer particle size is between 0 μm and 10 μm.

9. The method of claim 1, further comprising; carbonizing and graphitizing the admixture.

10. The method of claim 1, wherein the admixture comprises a mesophase pitch starting material and about 1% by weight carbon black particulate pore stabilizer, resulting in about 15% volume increase above non-pore stabilized carbon foam.

11. The method of claim 1, wherein the admixture comprises a mesophase pitch starting material and about 1% by weight silica fume particulate pore stabilizer, resulting in about 40% volume increase above non-pore stabilized carbon foam.

12. The method of claim 1, wherein the admixture comprises a particulate coal starting material and about 4% by weight calcined alumina particulate pore stabilizer, resulting in a more uniform distribution of pores.

13. The method of claim 1, wherein the pore stabilized carbon foam density is in the range of about 0.1 to about 0.8 g/cm$^3$.

14. The method of claim 1, further comprising; controllably cooling the admixture to a temperature below about 100° C.

15. The method of claim 1, wherein the heating step is performed in a non-oxidizing atmosphere at a heat up rate of about 1° C. to about 20° C. per hour.

16. The method of claim 1, further comprising; soaking the admixture at a temperature of between 300° C. and 700° C. for about 10 minutes to about 12 hours.

* * * * *